United States Patent
VoBa

(10) Patent No.: US 10,063,565 B2
(45) Date of Patent: Aug. 28, 2018

(54) METHOD AND SYSTEM FOR GEOLOCATION VERIFICATION OF RESOURCES

(71) Applicant: Sync-N-Scale, LLC, Burlington, WI (US)

(72) Inventor: Son VoBa, Sammamish, WA (US)

(73) Assignee: SYNC-N-SCALE, LLC, Burlington, WI (US)

( * ) Notice: Subject to any disclaimer, the term of this patent is extended or adjusted under 35 U.S.C. 154(b) by 129 days.

(21) Appl. No.: 14/926,453

(22) Filed: Oct. 29, 2015

(65) Prior Publication Data

US 2016/0127384 A1    May 5, 2016

Related U.S. Application Data

(60) Provisional application No. 62/073,008, filed on Oct. 30, 2014.

(51) Int. Cl.
  *G06F 7/04* (2006.01)
  *H04L 29/06* (2006.01)
  (Continued)

(52) U.S. Cl.
  CPC ............ *H04L 63/107* (2013.01); *G06F 21/53* (2013.01); *G06F 21/64* (2013.01); *H04L 67/18* (2013.01); *G06F 2221/2111* (2013.01)

(58) Field of Classification Search
  CPC ....... G06F 2221/2111; G06F 17/30233; G06F 2009/45595; H04L 63/107
  (Continued)

(56) References Cited

U.S. PATENT DOCUMENTS

| | | | |
|---|---|---|---|
| 2006/0132307 A1* | 6/2006 | Velhal | G06F 21/88 340/568.1 |
| 2011/0258247 A1* | 10/2011 | Gordon | G06F 21/88 709/202 |

(Continued)

OTHER PUBLICATIONS

Pritt et, Indoor Location with Wi-Fi Fingerprinting, Oct. 25, 2013, IEEE, pp. 1-8.*

(Continued)

*Primary Examiner* — Luu T Pham
*Assistant Examiner* — Jenise Jackson
(74) *Attorney, Agent, or Firm* — Nicholas A. Kees; Godfrey & Kahn S.C.

(57) ABSTRACT

A method of geolocation verification, including obtaining the geolocation of an operating system, generating a unique system ID for an installed operating system, and transmitting the geolocation of the operating system and a system ID to a data repository. The method further includes receiving a request to either initiate deployment of, or grant access to, a computer object associated with the operating system, identifying if the computer object requires geolocation verification, then identifying an object ID associated with the computer object and communicating each of the object ID, the geolocation of the operating system, and the system ID, to a domain controller for assessment. The method also includes searching the data repository to identify one or more geolocation object resource claims associated with the object ID, and comparing the geolocation resource claims with the communicated geolocation of the operating system.

10 Claims, 8 Drawing Sheets

(51) Int. Cl.
*H04L 29/08* (2006.01)
*G06F 21/53* (2013.01)
*G06F 21/64* (2013.01)

(58) Field of Classification Search
USPC .................................................... 726/7
See application file for complete search history.

(56) References Cited

U.S. PATENT DOCUMENTS

| | | | |
|---|---|---|---|
| 2012/0159156 | A1 | 6/2012 | Barham et al. |
| 2012/0311575 | A1* | 12/2012 | Song ............... G06F 9/5077 718/1 |
| 2014/0055491 | A1* | 2/2014 | Malamud .......... G06T 19/006 345/633 |
| 2014/0098990 | A1* | 4/2014 | Vian ............... G06K 9/00671 382/103 |
| 2014/0205099 | A1* | 7/2014 | Christodorescu ..... H04L 9/0819 380/278 |
| 2014/0337528 | A1* | 11/2014 | Barton ............... H04L 41/00 709/225 |
| 2017/0316616 | A1* | 11/2017 | Malamud ........... G01C 21/3652 |

OTHER PUBLICATIONS

Schuurman et al, Video-Rate Eigenspace Methods for Position Tracking and Remote Monitoring, 2002, IEEE, pp. 1-5.*
"Trusted Geolocation in the Cloud: Proof of Concept Implementation (draft)"; Erin K Banks et al.; NIST Interagency Report 7904, Dec. 31, 2012; Retrieved from the Internet: URL:http://csrc.nist.gov/publications/draft; s/ir7904/draftnistir 7904.pdf; retrieved on Aug. 12, 2015; p. 10-p. 13; figures 16, 17; p. 24; p. 33.
Vmware: "VMware KB: Looking up Managed Object Reference (MoRef) in vCenter Server"; Jul. 30, 2014; Retrieved tom the Internet: URL:http://kb.vmware.com/selfservice/microsites/search.do?language=en US&cmd=display; retrieved on Jan. 19, 2016.
Vmware: VMware KB: Editing virtual machine and host custom attributes, notes and annotations:, Aug. 29, 2014; Retrieved from the Internet: URL:http://kb.vmware.com/selfservice/microsites/search.do?language=en_US&cmd=display; retrieved on Jan. 19, 2016.
International Search Report for PCT/US2015/058102; dated Feb. 3, 2016.

* cited by examiner

METHOD AND SYSTEM FOR GEOLOCATION VERIFICATION OF RESOURCES

CROSS REFERENCE TO RELATED APPLICATIONS

The present application claims priority to U.S. Provisional Patent Application No. 62/073,008 filed on Oct. 30, 2014, which is herein incorporated by reference in its entirety.

FIELD

The method and system relate in general to the field of geolocation verification for various types of resources.

BACKGROUND

A datacenter is where application software and customer data running on the software are located. Vendors of cloud-based IT services must maintain transparency of where they replicate customer data at any given time for protection against failure or local disaster. If a datacenter ceases functioning for any reason, customer data will not be lost if the application software and customer data running on that application software are also available from a second or possibly third datacenter. And assuming it works smoothly enough, customers might not even be notified when such a failover occurs. Depending on the particular service, failover may not result in any service interruption at all.

Global enterprises have leveraged the Internet and cloud-based computing services, along with datacenters, to establish private communication networks and capture efficiencies from global technology. As a result of such globalization, in recent years, many nations have issued geographic location rules restricting how corporations can handle and transmit their customers' data across borders, including through these private networks. Certain entities require that specific types of data, for example government data, employee data, or telecommunications traffic data be stored within a limited geographical border, and in some cases, such data may even not be accessed from outside of a geographical border.

A geographic location is specified by a set of coordinates representing the latitude, longitude and elevation which are the principal elements of a geographic coordinate system. The latitude ($\varphi$, or phi) of a point on the Earth's surface is the angle between the equatorial plane and the straight line that passes through that point and through (or close to) the center of the Earth. The equator divides the globe into Northern and Southern Hemispheres. The longitude ($\lambda$, or lambda) of a point on the Earth's surface is the angle east or west from a reference meridian to another meridian that passes through that point. The internationally recognized reference Prime Meridian passes through a point in Greenwich, England, and determines the proper Eastern and Western Hemispheres. The elevation of a point on the Earth's surface is typically its height relative to sea level; while altitude is used for points above sea level, such as an aircraft in flight or a spacecraft in orbit, depth is used for points below sea level.

Geographic location of a position on Earth can be obtained from beacons like Wi-Fi access points and cell towers, from the IP address of a device, or it may come from other sources such as a Global Navigation Satellite System (GNSS) or Global Positioning System (GPS) device. The accuracy of geographic location information depends on the source, and may vary from the actual position of a device, computer or resource within the following exemplary ranges:

GPS: within approximately 10 meters
Wi-Fi: between approximately 30 meters and 500 meters
Cell towers: between approximately 300 meters and 3,000 meters
IP address: between approximately 1,000 meters and 5,000 meters When dealing with information technology operations, it is common to utilize the attribution of one or more types of claims. A claim is a unique piece of information about a user, device, computer, or resource. These are very often attributes that can be found as properties of a computer object in a domain name services directory—things like a user's functional title, organizational department or office location, are claims that can be defined. So is the business impact classification of a data file, or the health status of a computer. A computer object or entity can involve more than one claim, and any combination of claims can be used to authorize access to resources. The following exemplary types of claims are typically available in a commercially available domain name services directory:

User claims: attributes that are associated with a specific user.
Device claims: attributes that are associated with a specific computer object.
Resource attributes: global resource properties that are marked for use in authorization decisions.

Claims are generally protected in a domain name services directory which is operated upon and published by a domain controller and its surrogates. This is to prevent them from being tampered with by unauthorized personnel, and accessible only to properly authenticated users, devices and computers. Claims make it possible for administrators to make precise organization- or enterprise-wide statements about users, devices, computers, and resources that can be incorporated in expressions, rules, and policies for IT operations.

BRIEF SUMMARY

In at least some embodiments, the method and system for geolocation verification of resources is directed to the use of geographic location data (e.g., GPS signals) to determine whether a computer object (such as a virtual hard disk), can be deployed and its virtual machine can be operated by a physical server located in a specific geographical location. Further, in at least some embodiments, the domain controller arbitrates by resolving whether the current geographic location of the operating physical server is inside of the geographic region where a virtual machine can be operated.

Exemplary embodiments include methods and systems for determining the current geographic location of a physical server, including a general-purpose computer, a GPS system interface, a connecting cable, and a GPS antenna. To obtain authorization for deployment of a virtual hard disk based on the current geographic location of a physical server, the physical server acquires its current geographic location and the identification of the virtual hard disk to be deployed, and communicates the information to a domain controller. The domain controller performs the verification process and communicates a positive or negative assessment result to the physical server to indicate if deployment of the virtual machine contained inside the virtual hard disk can proceed. In at least some embodiments, the operating system (for both physical server and virtual machine) is capable of selfvalidation using the same method and system. The operating system forwards its current geographic location and its own identification to the domain controller. Upon receiving a satisfactory result to proceed, it may continue operating beyond the initial boot phases.

In at least some embodiments, the method and system for geolocation verification of resources relates to a method that includes providing an operating system in communication with at least one processor and at least one memory communicatively coupled to the at least one processor, the memory having stored therein computer-executable instructions; creating, via execution of the computer-executable instructions by the computing device, a computer object, the computer object including an authentication data portion and a program data portion, the authentication data portion being accessible by an application independently from accessing the program data portion of the computer object; generating a unique object ID for the computer object and writing the unique object ID into the authentication data portion and the program data portion; obtaining one or more geographic object resource claims for the computer object, wherein the geographic object resource claims include one or more geographic locations where the computer object is authorized to be operated; and communicating the unique object ID and the one or more geographic object resource claims to an authorizing entity.

In at least some additional embodiments, the method and system for geolocation verification of resources relates to a method that includes obtaining the geolocation of an operating system installed on a computing device that includes a processor and a memory having stored therein computer-executable instructions; generating a unique system ID for the installed operating system; transmitting the geolocation of the operating system and the system ID to a data repository for a domain controller in communication with the operating system; receiving at the computing device, a request to at least one of initiate deployment of, or grant access to a computer object associated with the operating system; identifying if the computer object requires geolocation verification, and if verification is required, then identifying an object ID associated with the computer object and communicating each of the object ID, the geolocation of the operating system, and the system ID, to the domain controller for assessment; performing a geolocation verification analysis that includes searching the data repository using the object ID to identify one or more geolocation object resource claims associated with the object ID, wherein the geographic object resource claims include one or more geographic locations where the computer object is authorized to be operated; and comparing the geolocation resource claims with the communicated geolocation of the operating system to provide confirmation or denial of geolocation verification for the computer object.

In at least some further embodiments, the method and system for geolocation verification of resources relates to a system including an operating system installed on a computing device. The computing device includes a processor and a memory having stored therein computer-executable instructions. At least one of, the operating system includes a unique system ID, and the computing device includes a unique device ID. A Global Positioning System interface is in communication with at least one of the computing device and the operating system, and is capable of providing a geolocation for at least one of the computing device and the operating system. A network interface transmits the geolocation of at least one of the computing device and the operating system, and at least one of the system ID and the device ID, to a domain controller in communication with a data repository. A computer object, associated with the operating system, includes a unique object ID and one or more geographic object resource claims. The geographic object resource claims include one or more geolocation boundaries where the computer object is authorized to be operated.

Other embodiments, aspects, features, objectives and advantages of the method and system will be understood and appreciated upon a full reading of the detailed description and the claims that follow.

BRIEF DESCRIPTION OF THE DRAWINGS

Embodiments of the method and system are disclosed with reference to the accompanying drawings and are for illustrative purposes only. The method and system is not limited in its application to the details of construction or the arrangement of the components illustrated in the drawings. The method and system are capable of other embodiments or of being practiced or carried out in other various ways. In the drawings.

DETAILED DESCRIPTION

The following detailed description refers to the accompanying drawings that illustrate exemplary embodiments of the present invention. However, the scope of the present invention is not limited to these embodiments. Thus, embodiments beyond those shown in the accompanying drawings, such as modified versions of the illustrated embodiments, may nevertheless be encompassed by the method and system of geographical verification.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Figure 1:
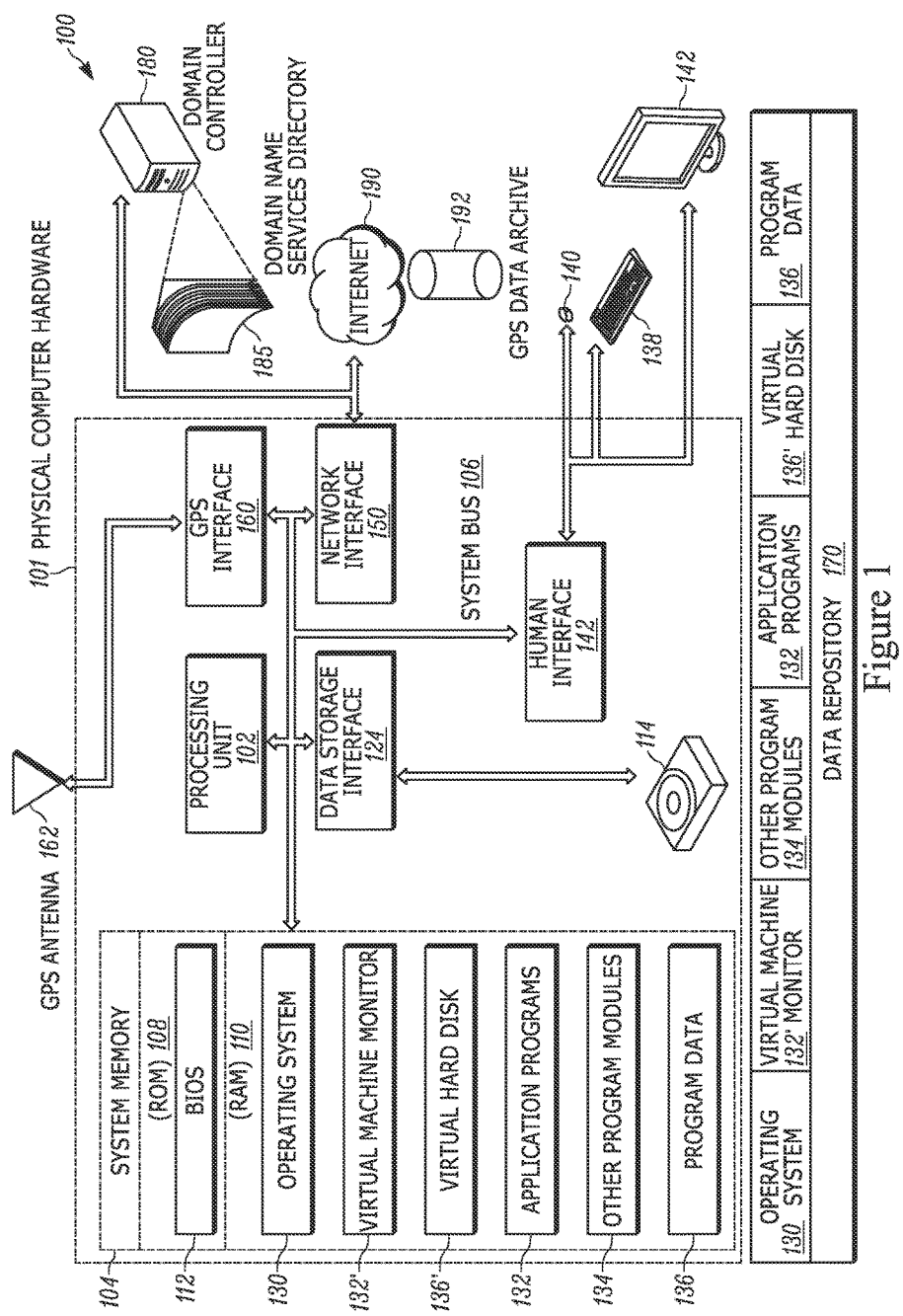
FIG. 1 illustrates a block diagram an exemplary computing environment and system.
Figure 2:
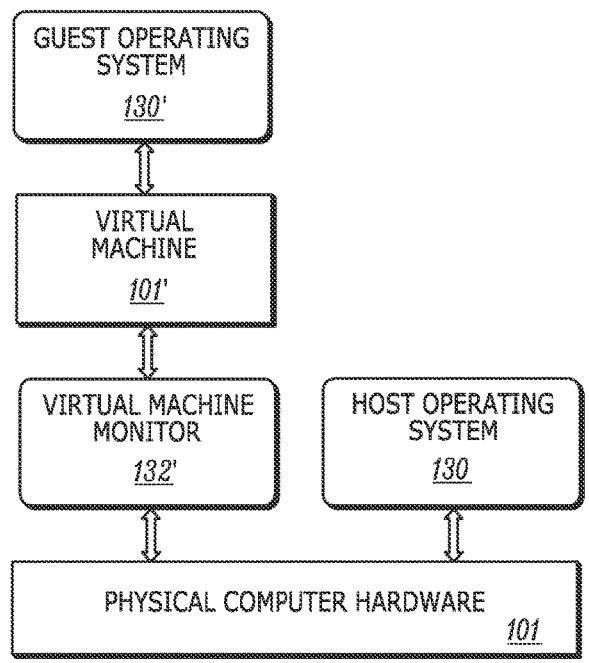
FIG. 2 illustrates a block diagram of an exemplary architecture of software and hardware.

FIG. 1 illustrates a block diagram of an exemplary computing environment and system 100, and FIG. 2 illustrates a block diagram of an exemplary architecture of software and hardware. In at least some embodiments, a system 100 includes a computer 101. Computer 101 may represent, for example, an enterprise or corporate server operating in its respective datacenter, or a server operated by a commercial hosting datacenter. However, this example is not intended to be limiting and computer 101 may operate in other environments as well, and persons skilled in the relevant art(s) will appreciate that the method and system described herein may be performed by a wide variety of computers other than computer 101. Computer 101 can include a device ID that uniquely identifies the computer 101, where the device ID can include numerous types of identifiers, such as serial numbers, etc. In addition, an operating system 130 can be installed on computer 101, which can include a system ID that is created when the operating system is installed on the computer 101. In each instance when an operating system is installed, a new unique system ID can be created for it.

Referring to FIG. 1, in at least some embodiments, computer 101 comprises a plurality of interconnected hardware components including, but not limited to, a processing unit 102, system memory 104, a data storage interface 124, a network interface 150, a human interface 142, and a GPS interface 160. System memory 104 includes computer storage media in the form of volatile and/or non-volatile memory such as ROM 108 and RAM 110. A basic input/output system 112 (BIOS), containing the basic routines that help to transfer information between elements within computer 101, such as during start-up, is typically stored in ROM 108. RAM 110 typically contains data and/or program modules that are immediately accessible to and/or presently being operated on by processing unit 102. By way of example, and not limitation, FIG. 1 illustrates an operating system 130, application programs 132, other program modules 134, program data 136, a virtual machine monitor 132', and a virtual hard disk 136'. Application programs 132 are sometimes referred to herein as executable binary files.

The computer 101 may also include other removable/non-removable, volatile/non-volatile computer storage media. By way of example only, FIG. 1 illustrates a hard disk drive 114 that reads from or writes to non-removable, non-volatile magnetic media. Other removable/non-removable, volatile/non-volatile computer storage media that can be used in the exemplary operating environment include, but are not limited to an optical disk, such as a CDROM or digital versatile disks, magnetic tape cassettes, flash memory cards, digital video tape, solid state RAM, solid state ROM, and the like. Hard disk drive 114 is typically connected to a system bus 106 through data storage interface 124. The computer 101 is configured to read from and write to a data repository that is reachable over at least one of an Intranet and Internet through its network interface 150 which is typically connected to system bus 106. In at least one embodiment, a domain name services directory 185 serves as an Intranet data repository, and a GPS data archive 192 serves as an Internet data repository. References herein to the use of domain name services directory 185 should be understood to include other data repositories that are provided in addition to, or in place of, domain name services directory 185, including but not limited to GPS data archive 192. Additional elements of computer 101 will be described in more detail below.

As discussed above, the method and system for geolocation verification of resources involves ascertaining the current geographic location of computer 101. More particularly, in at least some embodiments, the method and system for geolocation verification of resources includes ascertaining and attesting that a computer or its operating system is operating within an authorized geographic location. Specific geographical location determination can be performed in several different manners, although in at least one embodiment, the Global Positioning System (GPS) is utilized as a principal source to provide the desired geographical location data, while other embodiments can utilize other sources for obtaining geographical location data.

As shown in FIG. 1, processing unit 102, which comprises one or more microprocessors or microprocessor cores in computer 101, is designed to execute program instructions stored in system memory 104 to cause GPS interface 160 to communicatively connect to a GPS antenna 162, and to perform its designated functions. This interface facilitates the reception of GPS signals and the delivery of current time of day, latitude, longitude and transmitting satellite PRNs (Pseudo Random Noise) to operating system 130 of computer 101. In at least one embodiment, GPS interface 160 comprises a PCIe add-on card designed and manufactured by Sync-n-Scale, LLC of Burlington, Wis. However, this example is not intended to be limiting, and GPS interface 160 may comprise any conventional or subsequently-developed hardware, or a combination of hardware and software that is designed to rely on comparable navigation aiding systems and to perform the aforementioned functions.

In addition to obtaining the geographical location of a particular computer, the method and system for geolocation verification of resources can further include using geolocation information as a prerequisite indicator for starting and operating a computer object, such as a virtual machine, a self-contained application program, or a container, as discussed in detail below. Referring now to FIG. 2, virtual machine monitor 132', also called a hypervisor, is shown. A hypervisor is a special type of application program 132 that emulates another computer capable of running an operating system. The emulated computer is called a virtual machine, for example virtual machine 101'. Virtual machine 101' is capable of running operating system 130', which is the same operating system as computer operating system 130. Although not discussed in detail, more than one virtual machine 101' can be emulated via virtual machine monitor 132'.

Virtual machine monitor 132' can create and start virtual machine 101' using stored instructions in virtual hard disk 136'. Computer 101, or another similarly capable device, may be used to create the virtual hard disk 136' image, and to store it in a separate Intranet or Internet data repository, as discussed in greater detail below. A virtual hard disk 136' is, in at least some embodiments, a special type of program data 136 constructed in the form of a single computer file following a specific format. This file encapsulates an emulated storage device capable of carrying one or more file systems and supporting standard disk and file read and write operations. As a standard computer file, the virtual hard disk 136' is subject to storage, operating and access policies that other computer files would adhere to on the same computer. These policies are expressed as device claims and resource attributes, and are maintained in a domain name services directory, such as domain name services directory 185, which can be an organization- or enterprise-wide domain name services directory, or other comparable data repository. At creation, a virtual hard disk 136' would be cryptographically protected, or otherwise protected for security purposes, using classical data protection methods available to the hypervisor 132. This protection is performed to prevent tampering of or unauthorized access to the contents of a virtual hard disk 136' that forms a computer object.

Referring again to FIG. 1, in at least some embodiments, application program 132 can be self-sufficient and take the form of a single executable binary file or a special type of program module 134, also called a container. A container, can include everything an application program needs to run including: executable instructions, application run-time libraries, system tools and libraries. Similar to other objects, it can be cryptographically protected, or otherwise protected for security purposes at creation using classical data protection methods available to the operating system to prevent tampering.

As discussed above, in at least some embodiments, the method and system for geographic verification includes associating a geographic region with various computer object types. In at least some embodiments, the computer object can be comprised of a computer file, a storage device that contains a computer file, an interface that receives and emits a computer file from a storage device, a database that embodies a computer file, a storage device and an interface, and various other combinations.

Figure 3A:
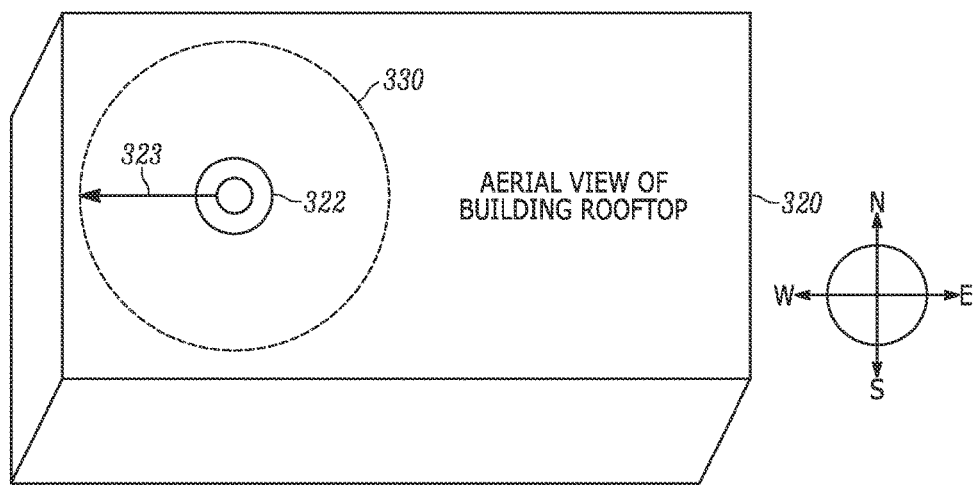
FIG. 3A illustrates a circular defined boundary of a geographical region of a site within a building.
Figure 3B:
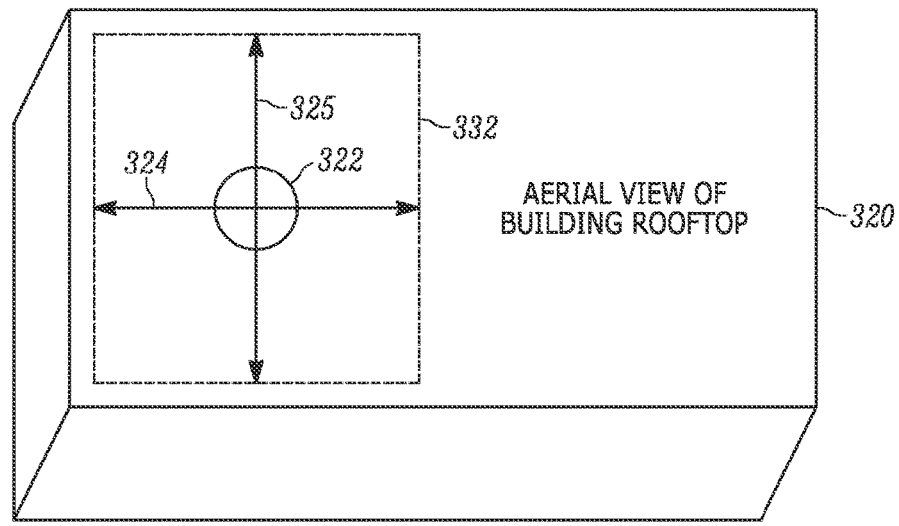
FIG. 3B illustrates a rectangular defined boundary of a geographical region of a site within a building.
Figure 3C:
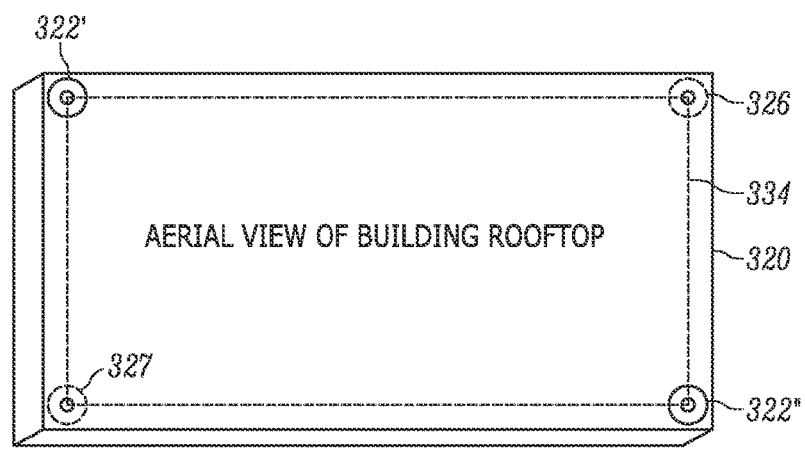
FIG. 3C illustrates another rectangular defined boundary of a geographical region of a site within a building.
Figure 3D:
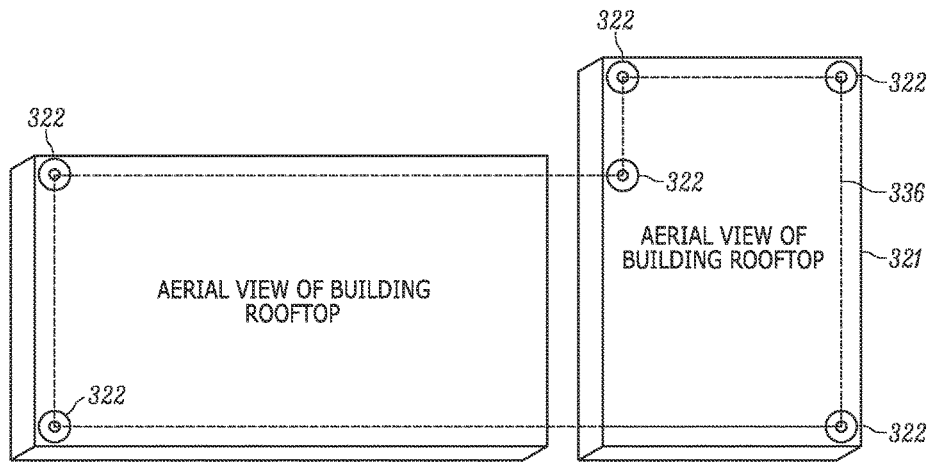
FIG. 3D illustrates a polygonal defined boundary of a geographical region of a site encompassing one or more buildings.
Figure 3E:
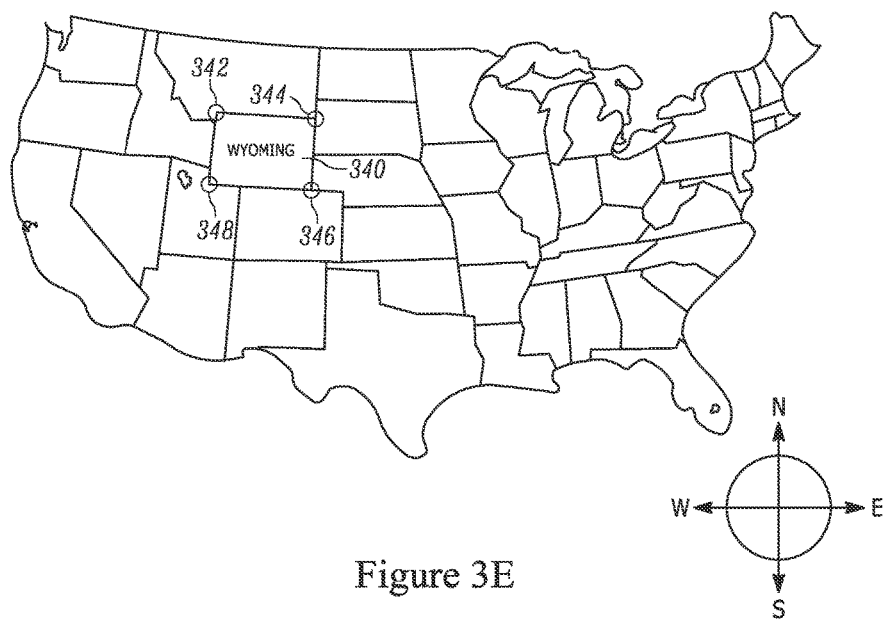
FIG. 3E illustrates a boundary of a geographical region of a jurisdiction, more particularly, the State of Wyoming (USA)

The geographic region providing the permissible location(s) where the computer object is permissibly operated may be identified by a collection of geolocation data points, and optionally by additional geometric dimensions. Referring to FIGS. 3A, 3B, 3C, 3D, and 3E, a grouping of these data points may contain any one of: a) a pair of longitude and latitude coordinates 322 plus a radius 323 (FIG. 3A), b) a pair of longitude and latitude coordinates 322 plus radiating length 324 and radiating width 325 (FIG. 3B), or c) a collection of two or more pairs of longitude and latitude coordinates (FIGS. 3C, 3D, 3E). Each grouping of these geolocation data points frame a perimeter, such as imaginary circle 330, rectangles 332, 334, or polygon 336. Each perimeter representing an actual contiguous and bounded geographic region on the Earth's surface where the computer object can be deployed, started and operated.

A geographic region can be as small as the immediate floor space surrounding a server rack footprint inside a datacenter building 320 (FIG. 3A), or as large as a jurisdiction 340 whose boundary is expressed as a series of geographic coordinate pairs 342, 344, 346, and 348, as shown in FIG. 3E. Further, a rectangular geographic region can be calculated or derived from geographic coordinates. The four corners of a rectangular geographic region perimeter can be calculated from the given geographic coordinate 322 and the radiating length 324 and width 325 as shown in FIG. 3B, or derived from the two given geographic coordinates 322' and 322" to obtain the other two 326 and 327, as shown in FIG. 3C.

Each grouping of these geolocation data points can be identified as a geolocation resource claim (i.e. resource attribute) of a computer device (e.g., server, etc.), an operating system associated with a computer device, or a computer object. Each computer object may be assigned multiple geolocation claims. Geolocation claims for a computer object may be referred to herein as geographic object resource claims. Geographic object resource claims can be recorded and associated with a computer object's unique identifier, referred to herein as an object ID (discussed in greater detail below). This information can be maintained in a domain name services directory 185 or similar type data repository. In at least some embodiments, access to domain name services directory 185 is limited to one or more levels of authorized access. Similar to assigning a computer object one or more geolocation claims, computer operating system 130 or hypervisor 132' can also be assigned at least one authorized operating geographic region. Each geographic region establishes an area within which operating system 130 is allowed to access similarly confined resources. This geographical extent includes one or more geolocation claims of the associated operating system or hypervisor instance (not the computer itself), and can be referred to herein as geographic resource device claims. Multiple geographic resource device claims can be assigned for this purpose. As with the geographic resource object claim, the geographic resource device claim and associated details are protected inside a different, or the same, domain name services directory 185 and would not be accessible by the administrator or operator of the computer without the required authorization.

Subsequent to the creation of one or more geolocation claims, an authorized user may add, subtract or replace the geolocation coordinates in the geolocation claim and extract them for information technology (IT) administrative purposes. Such changes can be accomplished using human interface 142, which will normally include devices such as a monitor 138, a keyboard 139, and a mouse 140. Separate from the geolocation claim, an assigned geolocation indicator (e.g., file attribute), which can inform a user of an intended permissible geolocation and identify if the computer object is tagged for verification (geo-tagged), can be associated with the computer object and therefore visible upon casual inspection by all users. The addition of an assigned geolocation indicator does not affect geolocation claims, as they remain protected and are therefore inaccessible under casual inspection. This separation of access authorization and control can be implemented for example, by domain controller 180 in combination with domain name services directory 185 or another data repository.

Figure 4:
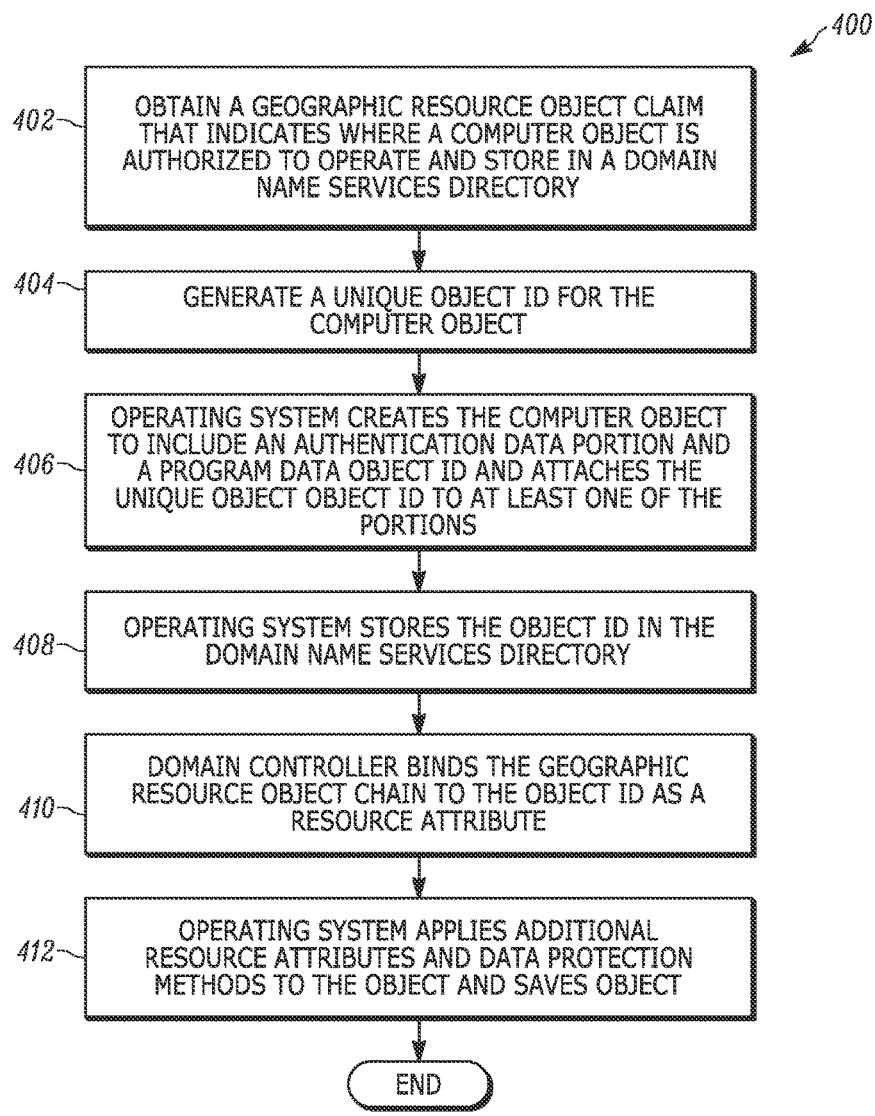
FIG. 4 illustrates a flow diagram of an exemplary method for marking a virtual hard disk to be operated in one or more specific geographic regions.

Marking a computer object with one or more geographic object resource claims (geo-tagging), can be performed with many types of computer-based operating systems and can take place in various locations, such as at a data center, or at a deployment center. An exemplary marking process is described with reference to flowchart 400 in FIG. 4. To begin the process, at step 402, the geographic resource object claim(s) is formed. More particularly, the geographical coordinates for one or more locations, such as that of a datacenter to be authorized to operate the computer object, are obtained and stored. In at least some embodiments, the geographical coordinates are stored as a resource attribute in domain name services directory 185 associated with a domain controller 180. At step 404, a unique object ID is generated for the computer object which will be used in the verification process. In at least some embodiments, the unique object ID is a Globally Unique ID (GUID), although other types of identifiers can be used.

At step 406, the computer object to require geolocation-based authorization for access or operation is created by the operating system, and the unique object ID is embedded or otherwise associated with the object. This task can be performed in many different ways. For example, when the computer object is file based, such as a virtual hard disk (e.g., virtual hard disk 136') for operating a virtual machine (e.g., virtual machine 101'), the virtual hard disk image file may be created with more than one portion (e.g. partition, section, etc.). In at least some embodiments, the sections can include an authentication data portion and a program data portion. The program data portion can contain, for example, the instructions for operating virtual machine 101' and the unique object ID. The authentication data portion can contain, for example, the unique object ID and geolocation verification requirement information about virtual machine 101', such as the geographic resource object claims. It is intended that the authentication data section would be accessible independently from accessing the program data portion, and only by an authorized entity. This would allow for authentication without access to the object's program content. In addition, the aforementioned process of providing a first secured portion that is separately viewable from a second secured portion can be used for various types of computer objects, as noted above.

At step 408, the operating system stores the unique object ID for the computer object in domain name services directory 185. At step 410, domain controller 180 binds the geographic resource object claim to the unique object ID in the domain name services directory 185 as a resource attribute. At step 412, the operating system applies additional resource attributes and data protection methods to the computer object for authorized access purposes and saves the computer object for later deployment. As noted above, one added attribute can be an assigned geolocation indicator. Once geo-tagged for geolocation, computer objects can be distributed to data centers or other sites for later access and can be recognizable as geo-tagged to an operating system trying to access the geo-tagged object.

Figure 5:
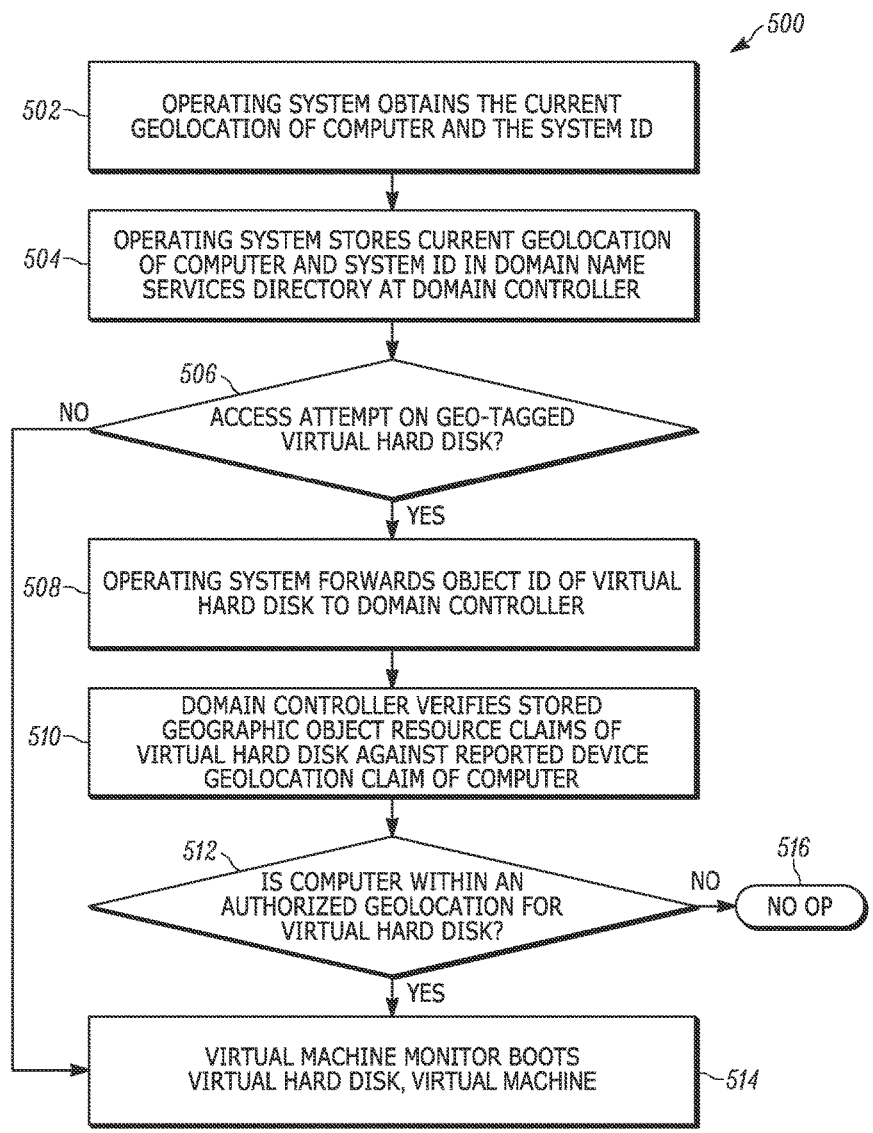
FIG. 5 illustrates a flow chart of an exemplary method for controlled deployment of a virtual machine that has been marked to operate in one or more specific geographic regions.
Figure 6:
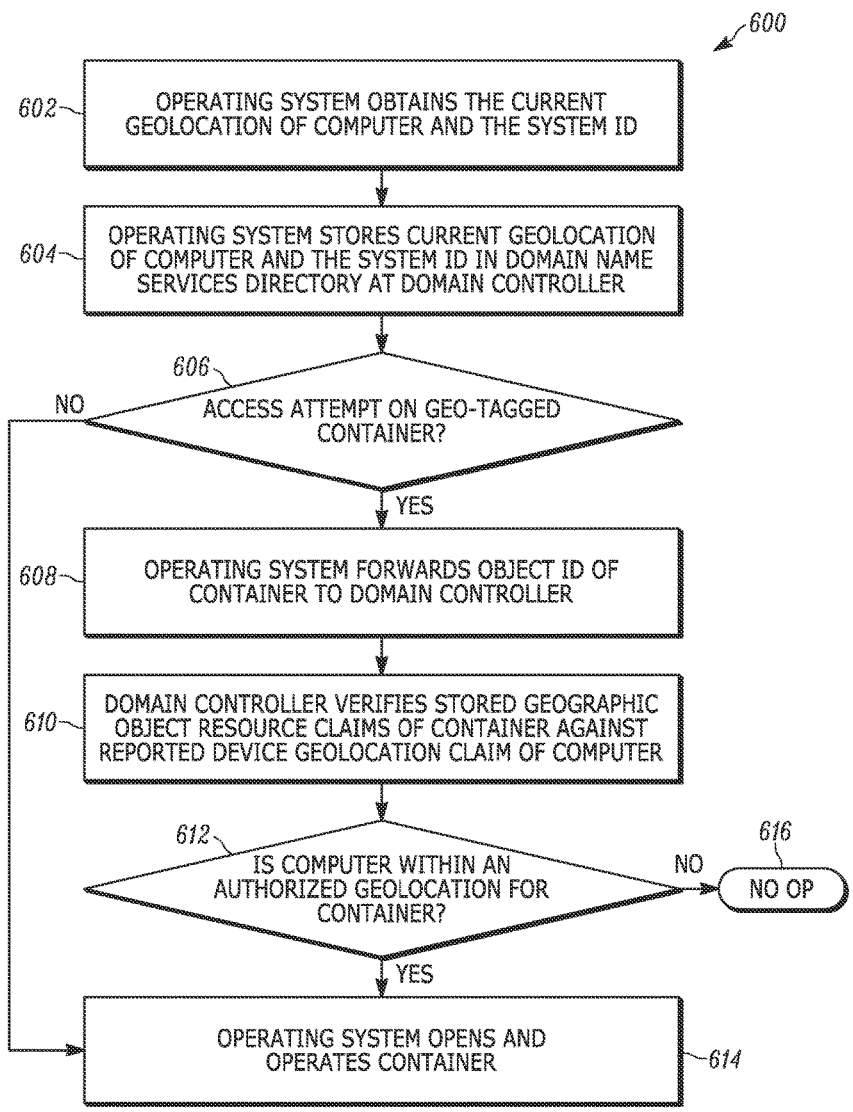
FIG. 6 illustrates a flow chart of an exemplary method for controlled deployment of an application container that has been marked to operate in one or more specific geographic regions.
Figure 7:
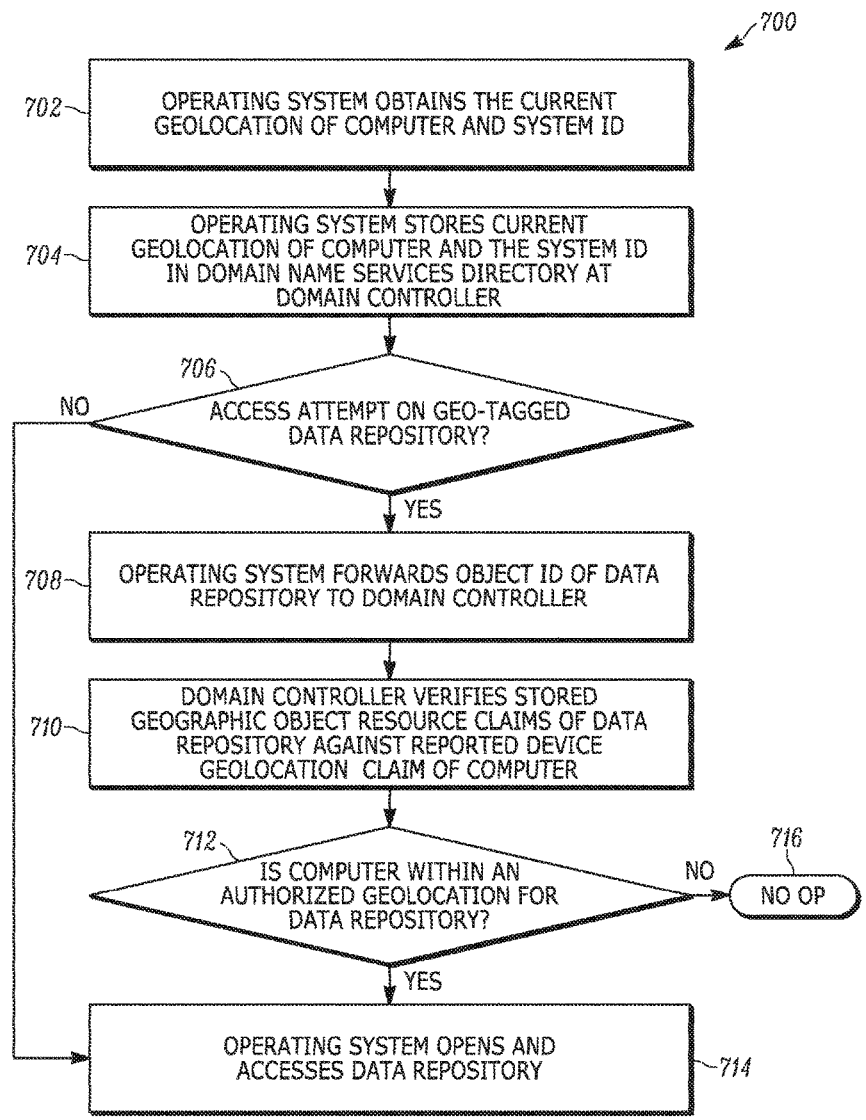
FIG. 7 illustrates a flow chart that represents an exemplary method for controlled access to a data repository that has been marked to be accessible from within one or more specific geographic regions.

Referring now to FIGS. 5, 6, and 7, to put a geo-tagged computer object into service at a datacenter or other service point, and in some cases, continue the use of a geo-tagged object, an access request is made and verification is performed. This process is discussed in detail below with reference to flow charts 500, 600, and 700. More particularly, the deployment/accessing of various types of objects, including an exemplary virtual machine (FIG. 5), an exemplary container (FIG. 6), and an exemplary data repository (FIG. 7) is discussed. As the procedural steps are, in at least some embodiments, similar for many types of computer objects, including these three types of computer objects, the steps will be addressed simultaneously for the three flow charts.

Beginning with steps 502, 602, 702, when operating system 130 begins a startup or resume event, and at times during its continued operation, operating system 130 obtains from its active GPS interface 160 (having a connected GPS antenna 162), the actual and attestable geolocation where it is currently being operated, also referred to herein as a device geolocation claim. If the computer being activated is a virtual machine (e.g., 101'), its operating system 130' obtains the geolocation information from its hypervisor 132'. At steps 504, 604, 704, the actual geolocation where the operating system 130 is currently operating is made available to system administrators and operators, and forwarded to the appropriate domain controller 180 to update domain name services directory 185. This process can be continuous, occurring before, during, and after a computer object is deployed or otherwise verified for operation.

At steps 506, 606, 706 the operating system 130 receives a request to initiate deployment of, or otherwise grant access to the computer object (virtual hard disk 136', container 134, or executable binary file 132). If the computer object is identified as geo-tagged, such as with a geolocation indicator, then the process advances to step 508, 608, 708, wherein operating system 130 communicates the unique object ID of the computer object to domain controller 180 for assessment. In at least some embodiments, the operating system 130 also communicates the system ID for the operating system 130. If the computer object is not identified by the operating system as geo-tagged, then the process advances to steps 514, 614, 714, wherein deployment and/or access to the computer object is granted. At steps 510, 610, 710, using the communicated object ID, the domain controller 180 searches the domain name services directory 185 to identify the geographic object resource claims for the computer object. Once identified, domain controller 180 initiates a comparison between the geographic object resource claims bound to the object ID as recorded in domain name services directory 185, with the reported device geolocation claim (geolocation coordinates) of operating system 130 that are also being stored in the domain name services directory 185. In at least some embodiments, the comparison includes domain controller 180 solving a point-in-polygon (PIP) problem using the communicated device geolocation claim and the geographic object resource claims. The PIP geometric calculation solves the question of whether a given point in a plane lies inside, outside, or on the boundary of a polygon. Classical geometric calculation and methods can also be used to determine whether a given geolocation associated with the computer object falls in or outside of an allowable defined contiguous geographic region on the Earth's surface. Such calculations are performed by the domain controller 180 in response to the access authorization request. More particularly, if at steps 512, 612, 712, the device geolocation claim is declared to fall within the boundary (i.e. region) representing the protected geographic object resource claim(s) assigned to the computer object, then the domain controller will declare the assessment to be a success and return a pass result confirming geolocation verification. If the device geolocation claim is declared to fall outside of the boundary (i.e. region) representing the protected geographic object resource claim(s) assigned to the computer object, then the process moves to steps 516, 616, 716 and the domain controller will declare the assessment to be a failure. In response, operating system 130 acts accordingly. That is, the process moves to steps 514, 614, 714, where operating system 130 and its hypervisor 132' are authorized to proceed with the deployment of virtual machine 101', running a guest operating system 130', executable binary file 132, or operating container 134.

Advantageously, this method can also provide an additional layer of protection of virtual hard disk 136' by preventing it from being copied within an organization and operated outside a specific physical datacenter site and in an unauthorized manner. This method also allows for discovery and mitigation when an attempt to deploy and start a virtual machine by a rogue employee who utilizes legitimate authorized access to the storage of a virtual hard disk for back-up and other data management operations, but not authorized to deploy and start a virtual machine using its contents. In addition to being able to attest to the location and jurisdiction contractual obligation of a system, this method in accordance with the principles of this invention also allows the vendors to determine best efficient datacenter sites to meet their customer demands while operating their workloads within environmental and infrastructural constraints such as electricity and communications. Furthermore, in at least some embodiments, this method can be used to ascertain if a user is operating a device or computer within a geographic region and therefore permitted by pre-determined policies to create a data repository 170 and attach it to an operating system, or to access an existing data repository being curated in the same or another geographic region.

As mentioned above, while exemplary embodiments of the present invention have been described in connection with various computing devices and system architectures, the underlying concepts may be applied to any computing device or system in which it is desirable to implement controlled deployment and operation of a virtual machine in a geographically specific datacenter.

Thus, the methods and systems of the present invention may be applied to a variety of applications and systems. While exemplary hardware interfaces, names and examples are chosen herein as representative of various choices, these hardware interfaces, names and examples are not intended to be limiting. One of ordinary skill in the art will appreciate that there are numerous ways of obtaining geolocation data that achieves the same, similar or equivalent systems and methods achieved by the invention.

The various techniques described herein may be implemented in connection with hardware or software or, where appropriate, with a combination of both. Thus, the methods and system of the present invention, or certain aspects or portions thereof, may take the form of program code (i.e., instructions) embodied in tangible media, such as CD-ROMs, flash drives, hard drives, or any other machine readable storage medium, wherein, when the program code is loaded into and executed by a machine, such as a computer, the machine becomes a system for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and system of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes a system for practicing the invention. When implemented on a general-purpose processor, the program code combines with the processor to provide a unique system that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims. Further, the steps described herein with reference to the method of operation are not to be considered limiting and can include variations, such as additional steps, removed steps, and re-ordered steps.

What is claimed is:

1. A method comprising:
    providing an operating system in communication with at least one processor and at least one memory communicatively coupled to the at least one processor, the memory having stored therein computer-executable instructions;
    creating, via execution of the computer-executable instructions, a computer object, the computer object including an authentication data portion and a program data portion, the authentication data portion being accessible by an application independently from accessing the program data portion of the computer object;
    generating a unique object ID for the computer object and writing the unique object ID into the authentication data portion and the program data portion;
    communicating, via a global positioning system interface, with a global positioning system to obtain geographic location information including time of day, latitude, longitude and transmitting satellite pseudo random noise;
    using the geographic location information to identify the geographic location where the operating system is currently operating;
    obtaining a geographic object resource claim for the computer object, wherein the geographic object resource claim corresponds with a geographic location where the computer object is authorized to be operated; and
    communicating the following to the authorizing entity: a) the object ID of the computer object, b) a device ID for a computer running the operating system, c) a system ID associated with the operating system, and d) the geographic location obtained from the global location information;
    receiving, in response to the communication, a positive geolocation verification from the authorizing entity or a negative geolocation verification, wherein upon receipt of a positive geolocation verification, the operating system is authorized to access the program data portion in the computer object, and wherein upon receipt of a negative geolocation verification, the operating system is not authorized to access the program data portion;

wherein the computer object is a virtual hard disk image of a virtual machine installed on a physical server; and wherein the operating system is installed and operating on the virtual machine in communication with the physical server.

2. The method of claim 1 wherein the computer-executable instructions are further executed by the operating system to include:

obtaining the computer object; and reading only the authentication data portion without accessing the program data portion.

3. The method of claim 1, wherein the computer object is at least one of a computer file, a storage device containing a computer file, an interface that receives and emits a computer file from a storage device, and a database.

4. The method of claim 1, wherein the operating system is installed and operated on a physical server.

5. A method of geolocation verification of an operating system installed on a computing device, which computing device includes a processor and a memory having stored therein computer executable instructions, the method comprising:

communicating, via a global positioning system interface, with a global positioning system, to obtain global location information including time of day, latitude, longitude, and transmitting satellite pseudo random noise so as to identify the geolocation of the operating system;

generating a unique system ID for the operating system;

transmitting the geolocation of the operating system and the system ID to a data repository for a domain controller in communication with the operating system;

receiving at the computing device, a request to grant access to a computer object associated with the operating system, the computer object including an authentication data portion and a program data portion, the authentication data portion being accessible by an application independently from accessing the program data portion;

identifying whether the computer object requires geolocation verification, and if verification is required, then identifying an object ID associated with the computer object and communicating each of the object ID, the geolocation of the operating system, and the system ID, to the domain controller for assessment;

performing a geolocation verification analysis that includes searching the data repository using the object ID to identify one or more geolocation object resource claims associated with the object ID, wherein the geographic object resource claims include one or more geographic locations where the computer object is authorized to be operated; and comparing the geolocation resource claims with the communicated geolocation of the operating system to provide verification as to whether access should be granted to the computer object;

wherein identifying whether the computer object requires geolocation verification does not include accessing the program data portion;

wherein only a confirmation of geolocation verification authorizes the operating system to access the program data portion;

identifying the computer object ID does not include accessing the program data portion;

confirming of geolocation verification authorizes the operating system to access the program data portion; and denying of geolocation verification of the computer object prevents the operating system from accessing the program data portion of the computer object.

6. The method of claim 5, wherein comparing the geolocation resource claims with the communicated geolocation of the computing device includes determining if the geolocation of the computing device is identified as being located within a geographical boundary defined by the geolocation resource claims.

7. The method of claim 5, wherein the computer object is at least one of a computer file, a storage device containing a computer file, a programming interface that receives and emits a computer file from a storage device, and a database query interface.

8. A system for geolocation verification comprising:

a computing device including a processor and a memory having stored therein computer-executable instructions and having assigned thereto a unique device ID;

an operating system installed on the computing device, wherein the operating system has assigned thereto a unique system ID;

a global positioning system interface in communication with at least one of the computing device and the operating system, and in communication with a global positioning system, and capable of obtaining global positioning information including time of day, latitude, longitude, and transmitting satellite pseudo random noise so as to provide a geolocation for the at least one of the computing device and the operating system;

a network interface for transmitting the geolocation of the at least one of the computing device and the operating system, and the at least one of the system ID and the device ID, to a domain controller in communication with a data repository; and a computer object associated with the operating system, the computer object including a unique object ID and one or more geographic object resource claims, the geographic object resource claims including one or more geolocation boundaries within which the computer object is authorized to be operated;

the computer object further including an authentication data portion and a program data portion, the authentication data portion being accessible independently from accessing the program data portion, with the program data portion being inaccessible prior to positive geolocation verification by an authorizing entity capable of communicating with the operating system;

wherein the operating system is a guest operating system operating on a virtual machine in communication with the computing device.

9. The system of claim 8, wherein geolocation verification is receivable from a domain controller in communication with the operating system, and wherein a positive geolocation verification is receivable by the operating system when the geolocation provided by the at least one of the computing device and the operating system is a geolocation that is situated within the boundaries established by the geographic object resource claims.

10. The system of claim 9, wherein the computer object is at least one of a computer file, a storage device containing a computer file, an interface that receives and emits a computer file from a storage device, and a database.

* * * * *